(12) United States Patent
Jansson Toftgård et al.

(10) Patent No.: US 12,348,952 B2
(45) Date of Patent: Jul. 1, 2025

(54) HEAD-RELATED (HR) FILTERS

(71) Applicant: Telefonaktiebolaget LM Ericsson (publ), Stockholm (SE)

(72) Inventors: Tomas Jansson Toftgård, Uppsala (SE); Rory Gamble, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 272 days.

(21) Appl. No.: 18/010,749

(22) PCT Filed: Nov. 20, 2020

(86) PCT No.: PCT/EP2020/082784
§ 371 (c)(1),
(2) Date: Dec. 15, 2022

(87) PCT Pub. No.: WO2021/254652
PCT Pub. Date: Dec. 23, 2021

(65) Prior Publication Data
US 2023/0254661 A1 Aug. 10, 2023

Related U.S. Application Data

(60) Provisional application No. 63/040,112, filed on Jun. 17, 2020.

(51) Int. Cl.
*H04S 7/00* (2006.01)
*G06F 9/30* (2018.01)
*G06F 17/16* (2006.01)

(52) U.S. Cl.
CPC ............ *H04S 7/305* (2013.01); *G06F 9/3001* (2013.01); *G06F 17/16* (2013.01)

(58) Field of Classification Search
CPC .... H04S 2420/01; H04S 2420/03; H04S 7/30; H04S 7/305; H04S 7/303; H04S 3/02;
(Continued)

(56) References Cited

U.S. PATENT DOCUMENTS 10,425,762 B1  9/2019  Schissler
2008/0052089 A1* 2/2008  Takagi ................. G10L 19/008
                                                          704/503
(Continued)

OTHER PUBLICATIONS

International Search Report and Written Opinion dated Feb. 16, 2021 in International Application No. PCT/EP2020/082784 (13 pages).

(Continued)

*Primary Examiner* — Norman Yu
(74) *Attorney, Agent, or Firm* — Rothwell, Figg, Ernst & Manbeck, P.C.

(57) ABSTRACT

A method (1000) for producing an estimated head-related (HR) filter, formula (I), that consists of a set of S HR filter sections formula (II) for s=1 to S. The method includes obtaining (s1002) an alpha matrix (e.g., an N×K matrix), wherein the alpha matrix consists of S sections, where each one of the sections of the alpha matrix corresponds to a different one of the S HR filter sections (e.g., the first section of the alpha matrix corresponds to formula (III), the second section of the alpha matrix corresponds to formula (IV), etc.), each section of the alpha matrix consists of N sub-vectors (N>1, e.g., N=8), and each sub-vector comprises a number of scalar values. The method further includes separately computing (s1004) each one of the S HR filter sections, wherein, for at least a certain one of the S HR filter sections, formula (II), the step of computing formula (II) comprises using not more than a predetermined number, $q_s$, of the sub-vectors within the section of the alpha matrix corresponding to formula (II) to compute formula (II), where $q_s$ is less than N.

13 Claims, 12 Drawing Sheets

(58) Field of Classification Search
CPC .... H04S 7/302; H04S 2400/11; G06F 9/3001; G06F 17/16
USPC ................................ 381/303, 17, 1, 310, 20
See application file for complete search history.

(56) References Cited

U.S. PATENT DOCUMENTS

2010/0329466 A1* 12/2010 Berge ....................... H04R 3/12
                                                    381/22
2012/0177204 A1*  7/2012 Hellmuth .............. G10L 19/008
                                                    381/22
2017/0245082 A1   8/2017 Boland
2021/0358507 A1  11/2021 Zhang et al.

OTHER PUBLICATIONS

Blauert, J., "Spatial Hearing: The Psychophysics of Human Sound Localization", chapters 1-4 translated by John S. Allen, Revised edition, The MIT Press, Cambridge, Massachusetts & London, England, 1997, 1983, http://direct.mit.edu/books/oa-monograph/chapter-pdf/2056429/f011001_9780262268684.pdf by guest on Nov. 2, 2022 (510 pages).

* cited by examiner

HEAD-RELATED (HR) FILTERS

CROSS REFERENCE TO RELATED APPLICATIONS

This application is a 35 U.S.C. § 371 National Stage of International Patent Application No. PCT/EP2020/082784, filed Nov. 20, 2020, which claims priority to U.S. provisional patent application No. 63/040,112, filed on Jun. 17, 2020. The above-identified applications are incorporated by this reference.

TECHNICAL FIELD

This disclosure relates to HR filters.

BACKGROUND

The human auditory system is equipped with two ears that capture the sound waves propagating towards the listener. FIG. 1 illustrates a sound wave propagating towards a listener from a direction of arrival (DOA) specified by a pair of elevation and azimuth angles in the spherical coordinate system. On the propagation path towards the listener, each sound wave interacts with the upper torso, head, outer ears, and the surrounding matter before reaching the left and right ear drums. This interaction results in temporal and spectral changes of the waveforms reaching the left and right eardrums, some of which are DOA-dependent.

Our auditory system has learned to interpret these changes to infer various spatial characteristics of the sound wave itself as well as the acoustic environment in which the listener finds himself/herself. This capability is called spatial hearing, which concerns how we evaluate spatial cues embedded in the binaural signal (i.e., the sound signals in the right and the left ear canals) to infer the location of an auditory event elicited by a sound event (a physical sound source) and acoustic characteristics caused by the physical environment (e.g. small room, tiled bathroom, auditorium, cave) we are in. This human capability, spatial hearing, can in turn be exploited to create a spatial audio scene by reintroducing the spatial cues in the binaural signal that would lead to a spatial perception of a sound.

The main spatial cues include 1) angular-related cues: binaural cues, i.e., the interaural level difference (ILD) and the interaural time difference (ITD), and monaural (or spectral) cues; 2) distance-related cues: intensity and direct-to-reverberant (D/R) energy ratio. A mathematical representation of the short-time DOA-dependent or angular-related temporal and spectral changes (1-5 milliseconds) of the waveform are the so-called head-related (HR) filters. The frequency domain (FD) representations of HR filters are the so-called head-related transfer functions (HRTFs) and the time domain (TD) representations are the head-related impulse responses (HRIRs). Such HR filters may also represent DOA-independent temporal and spectral characteristics corresponding to an interaction between a sound wave and the listener, e.g. related to resonances of the ear canals.

FIG. 2 illustrates an example of ITD and spectral cues of a sound wave propagating towards a listener. The two plots illustrate the magnitude responses of a pair of HR filters obtained at an elevation of 0 degrees and an azimuth of 40 degrees. (The data is from CIPIC database: subject-ID 28. The database is publicly available, which is located at www.ece.ucdavis.edu/cipic/spatial-sound/hrtf-data/).

An HR filter based binaural rendering approach has been gradually established, where a spatial audio scene is generated by directly filtering audio source signals with a pair of HR filters of desired locations. This approach is particularly attractive for many emerging applications, such as extended reality (XR) (e.g., virtual reality (VR), augmented reality (AR), or mixed reality (MR)), and mobile communication systems, where headsets are commonly used.

HR filters are often estimated from measurements as the impulse response of a linear dynamic system that transforms the original sound signal (input signal) into the left and right ear signals (output signals) that can be measured inside the ear canals of a listening subject at a predefined set of elevation and azimuth angles on a spherical surface of constant radius from a listening subject (e.g., an artificial head, a manikin or a human subject). The estimated HR filters are often provided as finite impulse response (FIR) filters and can be used directly in that format. To achieve an efficient binaural rendering, a pair of HRTFs may be converted to Interaural Transfer Function (ITF) or modified ITF to prevent abrupt spectral peaks. Alternatively, HRTFs may be described by a parametric representation. Such parameterized HRTFs may easily be integrated with parametric multichannel audio coders, e.g., MPEG surround and Spatial Audio Object Coding (SAOC).

In order to discuss the quality of different spatial audio rendering techniques, it is useful to introduce the concept of Minimum Audible Angle (MAA), which characterizes the sensitivity of the human auditory system to an angular displacement of a sound event. Regarding localization in azimuth, MAA is smallest in the front and back (about 1 degree), and much greater for lateral sound sources (about 10 degrees). Regarding localization in elevation, MAA in the median plane is smallest (about 4 degrees) in front of the listener, and increasing at elevations further from horizontal.

Spatial rendering of audio that leads to a convincing spatial perception of a sound source (object) at an arbitrary location in space requires a pair of HR filters representing a location within the MAA of the corresponding location. If the discrepancy in angle for the HR filter is below the MAA for the object location, then the discrepancy is not noticed by the listener; above this limit, a larger location discrepancy leads to a correspondingly more noticeable inaccuracy in position which the listener experiences. As the head-related filtering differs between people, personalized HR filters may be necessary to achieve an accurate rendering without audible inaccuracies in the perceived position.

HR filter measurements must be taken at finite measurement locations, but rendering may require filters for any possible location on a sphere surrounding the listener. A method of mapping is therefore required to convert from the discrete measurement set to the continuous spherical angle domain. Several methods exist, including: directly using the nearest available measurement, using interpolation methods, or using modelling techniques. These three rendering techniques are discussed in turn below.

1. Direct Use of Nearest Neighboring Point

The simplest technique for rendering is to use an HR filter from the closest point in a set of measurement points. Note that some computational work may be required to determine the nearest neighboring measurement point, which can become nontrivial for an irregularly-sampled set of measurement points on the 2D sphere. For a general object location, there will be some angular error between the desired filter location (corresponding to the object location) and the closest available HR filter measurement. For a sparsely-sampled set of HR filter measurements, this will lead to a noticeable error in object location; the error is reduced or effectively eliminated when a more densely-sampled set of measurement points is used. For moving objects, the HR filter changes in a stepwise fashion which does not correspond to the intended smooth movement.

Generally, densely-sampled measurements of HR filters are difficult to take for human subjects due to the requirement that the subject must sit still during data collection: small accidental movements of the subject limit the angular resolution that can be achieved. The process is also time-consuming for both subjects and technicians. It may be more efficient to infer spatial-related information about missing HR filters given a sparsely-sampled HR filter dataset (as outlined for the following methods) than to take such detailed measurements. Densely-sampled HR filter measurements are easier to capture for dummy heads, but the resulting HR filter set is not always well-suited to all listeners, sometimes leading to the perception of inaccurate or ambiguous object locations.

2. Interpolation Between Neighboring Points

If the sample points are not sufficiently densely spaced, interpolation between neighboring points can be used to generate an approximate filter for the DOA that is needed. The interpolated filter varies in a continuous manner between the discrete sample points, avoiding the abrupt changes that can occur with the nearest neighbor method. This method incurs additional complexity in generating the interpolated HR filter values, with the resulting HR filter having a broadened (less point-like) perceived DOA due to mixing of filters from different locations. Also, measures need to be taken to prevent phasing issues that arise from mixing the filters directly, which can add complexity.

3. Modelling-Based Filter Generation

More advanced techniques can be used to construct a model for the underlying system which gives rise to the HR filters and how they vary with angle. Given a set of HR filter measurements, the model parameters are tuned to reproduce the measurements with minimal error and thereby create a mechanism for generating HR filters not only at the measurement locations but more generally as a continuous function of the angle space.

Other methods exist for generating an HR filter as a continuous function of DOA which do not require an input set of measurements, using instead high resolution 3D scans of the listener's head and ears to model the wave propagation around the subject's head to predict the HR filter behavior.

In the next section, a category of HR filter models is presented which make use of weighted basis vectors to represent HR filters.

3.1 HR Filter Model Using Weighted Basis Vectors—Mathematical Framework

Consider a model for an HR filter with the following form:

$$\hat{h}(\theta, \phi) = \sum_n^N \sum_k^K \alpha_{n,k} F_{k,n}(\theta, \phi) e_k, \qquad (1)$$

where
$\hat{h}(\theta, \phi)$ is the estimated HR filter, a vector of length K, for a specific $(\theta, \phi)$ angle;
$\alpha_{n,k}$ are a set of scalar values which are independent of angles $(\theta, \phi)$, where this set of scalar values is organized into N basis vectors $(\alpha_1, \alpha_2, \ldots, \alpha_N)$ each of length K (hence, scalar value $\alpha_{n,k}$ is the k-th value of vector $\alpha_n$);

$F_{k,n}(\theta, \phi)$ are a set of scalar-valued functions which are dependent upon angles $(\theta, \phi)$; and
$e_k$ are a set of orthogonal basis vectors which span the K-dimensional space of the $\hat{h}(\theta, \phi)$ filters.

The model functions $F_{k,n}(\theta, \phi)$ are determined as part of the model design and are usually chosen such that the variation of the HR filter set over the elevation and azimuth dimensions is well-captured. With the model functions specified, the model parameters $\alpha_{n,k}$ can be estimated with data fitting methods such as minimized least squares methods.

It is not uncommon to use the same modelling functions for all of the HR filter coefficients, which results in a particular subset of this type of model where the model functions $F_{k,n}(\theta, \phi)$ are independent of position k within the filter:

$$F_{k,n}(\theta, \phi) = F_n(\theta, \phi), \forall k \qquad (2)$$

The model can then be expressed as:

$$\hat{h}(\theta, \phi) = \sum_n^N F_n(\theta, \phi) \sum_k^K \alpha_{n,k} e_k. \qquad (3)$$

In one application, the $e_k$ basis vectors are the natural basis vectors $e_1 = [1, 0, 0, \ldots 0]$, $e_2 = [0, 1, 0, \ldots 0] \ldots$, which are aligned with the coordinate system being used. For compactness, when the natural basis vectors are used, we may write $$\sum_k^K \alpha_{n,k} e_k = [\alpha_{n,1}, \alpha_{n,2}, \ldots, \alpha_{n,K}] = \alpha_n, \qquad (4)$$

where the $\alpha_n$ are vectors of length K. This leads to the equivalent expression for the model $$\hat{h}(\theta, \phi) = \sum_n^N F_n(\theta, \phi) \alpha_n. \qquad (5)$$

That is, once the parameters $\alpha_{n,k}$ have been estimated, $\hat{h}$ is expressed as a linear combination of fixed basis vectors an, where the angular variation of the HR filter is captured in the weighting values $F_n(\theta, \phi)$. That is, each basis vector an is associated with a weighting value $F_n(\theta, \phi)$.

This equivalent expression is a compact expression in the case where the unit basis vectors are the natural basis vectors, but it should be remembered that the following method can be applied (without this convenient notation) to a model which uses any choice of orthogonal basis vectors in any domain. Other applications of the same underlying modelling technique would be a different choice of orthogonal basis vectors in the time domain (Hermite polynomials, sinusoids etc) or in a domain other than the time domain, such as the frequency domain (via e.g. a Fourier transform) or any other domain in which it is natural to express the HR filters.

Note that $\hat{h}$ (i.e., the estimated HR filter) is the result of the model evaluation specified in equation (5), and should be similar to a measurement of h (i.e., the HR filter) at the same location. For a test point $(\theta_{test}, \phi_{test})$ where a real measurement of h is known, $h(\theta_{test}, \phi_{test})$ and $\hat{h}(\theta_{test}, \phi_{test})$ can be compared to evaluate the quality of the model. If the model is deemed to be accurate, it can also be used to generate an estimate (i.e., $\hat{h}$) for some general point which is not one of the points where h has been measured.

Note also that an equivalent matrix formulation of equation (5) is:

$$\hat{h}(\theta, \phi) = f(\theta, \phi)\alpha \qquad (6)$$

where $f(\theta, \phi)$=row vector of weighting values, length N, i.e.

$$f(\theta, \phi) = [F_1(\theta, \phi), F_2(\theta, \phi), \ldots, F_N(\theta, \phi)],$$

$\alpha$=the set of N basis vectors, organized as rows in a matrix, N rows by K column, i.e.

$$\alpha = \begin{bmatrix} \alpha_1 \\ \alpha_2 \\ \vdots \\ \alpha_N \end{bmatrix}.$$

A complete binaural representation includes left and right HR filters for the left and right ears respectively. Using two separate models in the form of equation (1), two different sets of model parameters $\alpha_{n,k}$ would be obtained, representing the left and right HR filters. The functions $F_n(\theta, \phi)$ and basis functions $e_k$ may in general be different for the left and right HR filter models but would typically be the same for both models.

SUMMARY

The three above described methods for inferring an HR filter on a continuous domain of angles have varying levels of computational complexity and perceived location accuracy. Direct use of nearest neighboring point is the simplest in terms of computational complexity, but requires densely-sampled measurements of HR filters, which are not easy to obtain and result in large amounts of data. In contrast to methods that directly use the measured HR filters, models for HR filters have the advantage that they can generate an HR filter with point-like localization properties that smoothly vary as the DOA changes. These methods can also represent the set of HR filters in a more compact form, requiring fewer resources for transmission or storage and also in program memory when they are in use. These advantages, however, come at the cost of computational complexity: the model must be evaluated to generate an HR filter before the filter can be used. Computational complexity is a problem for rendering systems with limited calculation capacity, as it limits the number of audio objects that may be rendered, e.g. in a real-time audio scene.

In spatial audio renderers it is desirable to be able to obtain estimated HR filters for any elevation-azimuth angle in real-time from a model evaluation equation such as equation (5). To make this possible, the HR filter evaluation specified in equation (5) needs to be executed very efficiently. The problem addressed in this disclosure is a good approximation to equation (5) which is efficient to evaluate. That is, this disclosure describes an optimization to the evaluation of HR filter models of this type shown in equation (5).

More specifically, this disclosure provides a mechanism to dynamically adjust the accuracy of the estimated HR filters produced by the HRTF model: quantifying the model with a lower level of accuracy results in a corresponding reduction in computational complexity. Furthermore, the allocation of detail/complexity can be dynamically allocated to different parts of the HR filter pair that is produced; the parts of the filter pair which are of the greatest importance in contributing to a convincing spatial perception can be allocated a greater share of the computational load to allow a higher level of detail, in balance with allocating a lesser share of the computational load where the level of detail is less important.

In one aspect there is provided a method for producing an estimated head-related (HR) filter, $\hat{h}'$, that consists of a set of S HR filter sections $\hat{h}'_s$ for s=1 to S. The method includes obtaining an alpha matrix (e.g., an N×K matrix), wherein the alpha matrix consists of S sections (e.g., S number of N×J submatrices, where J=K/S), each section of the alpha matrix corresponds to a different one of the S HR filter sections, each section of the alpha matrix consists of N sub-vectors (e.g., N number of 1×J matrices), and each sub-vector comprises a number of scalar values (e.g., J scalar values). The method also includes separately computing each one of the S HR filter sections, wherein, for at least a certain one of the S HR filter sections, $\hat{h}'_s$, the step of computing $\hat{h}'_s$ comprises using not more than a predetermined number, $q_s$, of the sub-vectors within the section of the alpha matrix corresponding to $\hat{h}'_s$ to compute $\hat{h}'_s$, where $q_s$ is less than N (i.e., not using N–$q_s$ of the sub-vectors within the section when computing $\hat{h}'_s$).

In another aspect there is provided a method for audio signal filtering. The method includes obtaining an audio signal; producing an estimated head-related, HR, filter according to any one of embodiments disclosed herein; and filtering the audio signal using the estimated HR filter.

In another aspect there is provided a computer program comprising instructions which when executed by processing circuitry of an audio rendering apparatus causes the audio rendering apparatus to perform the method of any one of the embodiments disclosed herein. In another aspect there is provided a carrier containing the computer program, wherein the carrier is one of an electronic signal, an optical signal, a radio signal, and a computer readable storage medium.

In another aspect there is provided an audio rendering apparatus for producing an estimated head-related (HR) filter, $\hat{h}'$, that consists of a set of S HR filter sections $\hat{h}'_s$ for s=1 to S. In one embodiment the audio rendering apparatus is adapted to obtain an alpha matrix (e.g., an N×K matrix), wherein the alpha matrix consists of S sections (e.g., S number of N×J submatrices, where J=K/S), each section of the alpha matrix corresponds to a different one of the S HR filter sections, each section of the alpha matrix consists of N sub-vectors (e.g., N number of 1×J matrices), and each sub-vector comprises a number of scalar values (e.g., J scalar values). The apparatus is also adapted to separately compute each one of the S HR filter sections, wherein, for at least a certain one of the S HR filter sections, $\hat{h}'_s$, the step of computing $\hat{h}'_s$ comprises using not more than a predetermined number, $q_s$, of the sub-vectors within the section of the alpha matrix corresponding to $\hat{h}'_s$ to compute $\hat{h}'_s$, where $q_s$ is less than N (i.e., not using N–$q_s$ of the sub-vectors within the section when computing $\hat{h}'_s$).

In another aspect there is provided an audio rendering apparatus for audio signal filtering. In one embodiment the audio rendering apparatus is adapted to obtain an audio signal, produce an estimated HR filter according to any one of the methods disclosed herein, and filter the audio signal using the estimated HR filter.

In some embodiments, the audio rendering apparatus comprises processing circuitry and a memory, the memory containing instructions executable by the processing circuitry.

The proposed embodiments described herein provide a flexible mechanism to reduce computational complexity when evaluating HR filters, e.g. based on a HR filter model, by omitting components which do not contribute significant detail to the filter. Within this reduced complexity budget, computational complexity (and therefore filter accuracy) can be dynamically allocated to the parts of the HR filter pair that are most important for convincing spatial perception. This enables efficient use of resources in situations where the computational capability of the rendering device is constrained, such as in mobile devices or in complex audio scenes with many rendered audio sources.

BRIEF DESCRIPTION OF THE DRAWINGS

The accompanying drawings, which are incorporated herein and form part of the specification, illustrate various embodiments.

DETAILED DESCRIPTION

Figure 1:
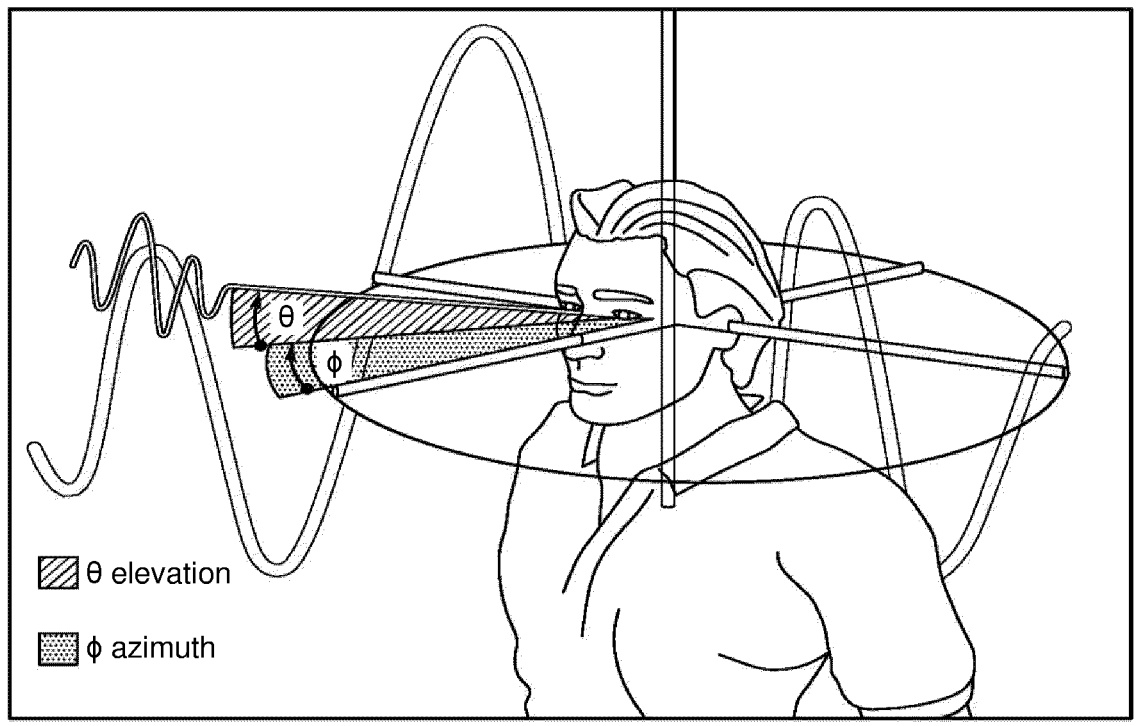
FIG. 1 illustrates a sound wave propagating towards a listener.
Figure 2:
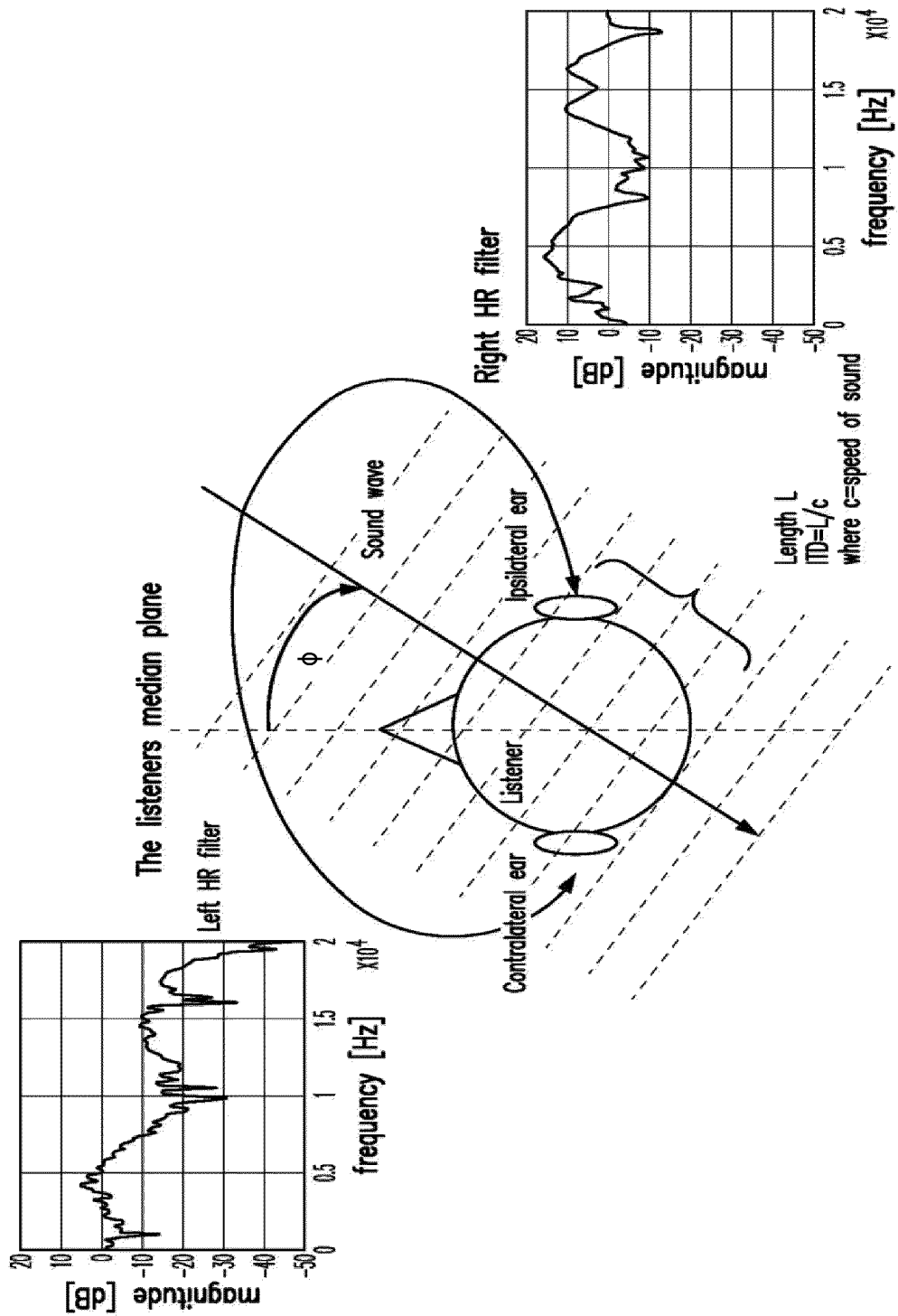
FIG. 2 illustrates an example of ITD and spectral cues of a sound wave propagating towards a listener.

As described above, equation (6) is the equivalent matrix formulation for equation (5). Omitting the angular dependence on $\hat{h}$ and f, equation (6) can be written as:

$$\hat{h} = f\alpha \quad (7)$$

where
$\hat{h}$=the synthesized HR function for one ear, containing K filter taps,
f=row vector of weighting values for one ear, length N,
$\alpha$=the set of basis vectors for one ear, organized as rows in a matrix, N rows by
K columns ($\alpha$ is also referred to herein as "alpha").

The following algorithm is applied for a specific ($\theta$, $\phi$) pair.

1. Algorithm

This section describes an algorithm for the calculation of an optimized estimate for one HR filter (i.e., one particular ($\theta$, $\phi$) object location and one of the two ears).

Step 1: Partition the matrix $\alpha$ into S (e.g., S=8) sections (a.k.a., submatrices) where each section has N rows and a number of columns (e.g., S sections of equal length J, where J=K/S, but the S sections do not have to be of the same length), allocating contiguous ranges of columns to the different sections. For example, each basis vector an is partitioned into S sub-vectors, thereby forming N×S sub-vectors ($\alpha_{n,s}$) and each of the sub-vectors consists of J columns (or "entries") (i.e., a set J scalar values). In other words, each one of the S sections of matrix $\alpha$ comprises N sub-vectors (e.g., section s of matrix $\alpha$ comprises sub-vectors: $\alpha_{1,s}, \alpha_{2,s}, \ldots, \alpha_{N,s}$). Matrices and vectors are denoted using bold typeface.

$$\alpha = \begin{bmatrix} [\alpha_{111} \ \alpha_{112} \ \cdots \ \alpha_{11J}] & [\alpha_{121} \ \alpha_{122} \ \cdots] & \cdots & [\alpha_{1S1} \ \alpha_{1S2} \ \cdots] \\ [\alpha_{211} \ \alpha_{212} \ \cdots \ \alpha_{21J}] & [\alpha_{221} \ \alpha_{222} \ \cdots] & \cdots & [\alpha_{2S1} \ \alpha_{2S2} \ \cdots] \\ \vdots & \vdots & \ddots & \vdots \\ [\alpha_{N11} \ \alpha_{N12} \ \cdots \ \alpha_{N1J}] & [\alpha_{N21} \ \alpha_{N22} \ \cdots] & \cdots & [\alpha_{NS1} \ \alpha_{NS2} \ \cdots] \end{bmatrix} \quad (8)$$

$$= \begin{bmatrix} \alpha_{11} & \alpha_{12} & \cdots & \alpha_{1S} \\ \alpha_{21} & \alpha_{22} & \cdots & \alpha_{2S} \\ \vdots & \vdots & \ddots & \vdots \\ \alpha_{N1} & \alpha_{N2} & \cdots & \alpha_{NS} \end{bmatrix} \quad (9)$$

The sub-vector $\alpha_{ns}$ denotes a subsection (or sub-vector) of basis vector an (a summary of the different indexing schemes for a that are used in this document is given in the abbreviations section). In this embodiment, each sub-vector $\alpha_{ns}$ contains J columns and a single row (i.e., each sub-vector $\alpha_{ns}$ contains J scalar values). Hence, the matrix $\alpha$ can be expressed as an N×S matrix of sub-vectors (i.e., submatrices) as shown in equation (9), as opposed to being expressed as a N×1 matrix of basis vectors as shown in equation (6a). Equivalently, the matrix $\alpha$ can be expressed as a 1×S matrix (vector) of submatrices, where each submatrix consists of N sub-vectors (i.e., submatrix s consists of the following sub-vectors: $\alpha_{1,s}, \alpha_{2,s}, \ldots, \alpha_{Ns}$). Each scalar value in $\alpha$ can be indexed by either: row n, column k of the full matrix as $\alpha_{n,k}$, or by row n, section (submatrix) s, column j within section s as $\alpha_{n,s,j}$. That is, the relationship between k and the s,j tuple is: k=((s−1)×J)+j.

The last entry in $\alpha_{n,s}$ (i.e. $\alpha_{n,s,(last)}$) (assuming section s is not the last section) and the first entry in $\alpha_{n,(s+1)}$ (i.e. $\alpha_{n,(s+1),1}$) are adjacent entries in the same row of the unpartitioned matrix $\alpha$. That is, if $\alpha_{n,s,j} = \alpha_{n,k}$ then $\alpha_{n,s+1,1} = \alpha_{n,k+1}$. Similarly, $\alpha_{n,s,j}$ and $\alpha_{(n+1),s,j}$ are adjacent entries in the same column of the unpartitioned matrix $\alpha$.

This partitioning of a is an alternative indexing regime which is used in the steps that follow.

Step 2: An importance metric associated with sub-vector $\alpha_{n,s}$ is calculated. As an example, using energy $E_{ns}$ as a metric:

$$E_{ns} = \sum_j (f_n \alpha_{nsj})^2 = f_n^2 \sum_j \alpha_{nsj}^2 \quad (10)$$

where $f_n$ is the weight value associated with basis vector $\alpha_n$. Other possible metrics are described below.

The sum of squares term for each n of s of $\alpha$ is independent of $(\theta, \phi)$ and can therefore be precalculated (step 2).

Step 3: Determine $f_n$ for the required $(\theta, \phi)$

Step 4: Calculate the signal energy $E_{ns}$ for each sub-vector using the precalculated values from step (2) and the stored result from step (3), according to equation (10) above.

Step 5: Calculate the sum of signal energies E (all basis functions) for each section:

$$E_s = \sum_n E_{ns} \quad (11)$$

Step 6: Determine the index ordering $M_s$ which sorts the list of the n $E_{ns}$ values for section s, from largest to smallest.

Step 7: For each section, the number of sub-vectors within the section to be used to determine section s of $\hat{h}$, is predetermined, where $q_s$ denotes the predetermined number. This number ($q_s$) is less than or equal to the total number of sub-vectors available within the section (i.e., N). In the case where $q_s=0$, zero values are used for $\hat{h}_s$. This can be useful for e.g. an effective truncation of the filter without changing its length. In one embodiment where S=8, q=[8, 8, 7, 5, 4, 3, 2, 2] (i.e., $q_1$=8, which means that all 8 of the sub-vectors within section 1 are used to determine $\hat{h}_1$, and $q_8$=2, which means that only 2 of the sub-vectors within section 8 are used to determine $\hat{h}_8$).

Step 8: Calculate the sum of signal energies E' for those $q_s$ basis vectors which will be used in section s of $\hat{h}$, by summing the signal energy values that were calculated and stored in step (5) above.

$$E'_s = \Sigma_n E_{ns}, \text{ where } n=M_1, M_2, \ldots, M_{qs} \quad (12)$$

Step 9: Calculate a scaling value for each section s of $\hat{h}$ to account for lost energy.

$$p_s = \sqrt{\frac{E_s}{E'_s}} \geq 1 \quad (13)$$

Step 10: Using the $q_s$ sub-vectors within section s that contribute the largest energy contributions for section s (that is, the first $q_s$ values of the ordered indices $M_s$ stored from step (7)), calculate the approximated $\hat{h}_s$ signal, denoted $\hat{h}'_s$:

$$\hat{h}'_s = p_s f'_s \alpha'_s \quad (14)$$

where f' are the weight values corresponding to the selected sub-vectors within section s (i.e., the sub-vectors corresponding to the first $q_s$ entries of the ordered indices $M_s$), $\alpha'$, the selected $q_s$ sub-vectors within section s (i.e., the $q_s$ sub-vectors that have the highest energy value $E_{ns}$).

The number of floating point multiplications in this step is reduced to q/N of the full model quantification, equation (6).

As a specific example of step 10, assuming that:
q7=2,
M1=3 and M2=5 for section s=7,
$\text{alpha}_{n=3,s=7}$=[1.5, 2.1, 0.3, −0.8, −1.1]
$\text{alpha}_{n=5,s=7}$=[2.6, 3.2, 1.4, −1.9, −2.2],
$f_7$=[0.2, 0.7, 0.3, 0.1, 0.5, 0.8] (i.e., $f_{3,7}$=0.3 and $f_{5,7}$=0.5),
$p_7$=1.34, then $\hat{h}'_7 = p_7(f_{3,7} \times \text{alpha}_{3,7} + f_{5,7} \times \text{alpha}_{5,7})$ $\hat{h}'_7 = 1.34 \times (0.3 \times [1.5, 2.1, 0.3, −0.8, −1.1] + 0.5 \times [2.6, 3.2, 1.4, −1.9, −2.2])$ $\hat{h}'_7 = 0.402 \times [1.5, 2.1, 0.3, −0.8, −1.1] + 0.67 \times [2.6, 3.2, 1.4, −1.9, −2.2]$ $\hat{h}'_7 = [0.603, 0.844, 0.120, −0.322, −0.442] + [1.742, 2.144, 0.938, −1.273, −1.474]$ $\hat{h}'_7 = [2.345, 2.988, 1.058, −1.595, −1.916]$ Step 11: Assemble the final estimate for the HR filter ($\hat{h}$) by concatenating the $\hat{h}'_s$ from the adjacent sections.

$$\hat{h}' = [\hat{h}'_1 \; \hat{h}'_2 \ldots \hat{h}'_s] \quad (15)$$

Schematics of Algorithm

Figure 3:
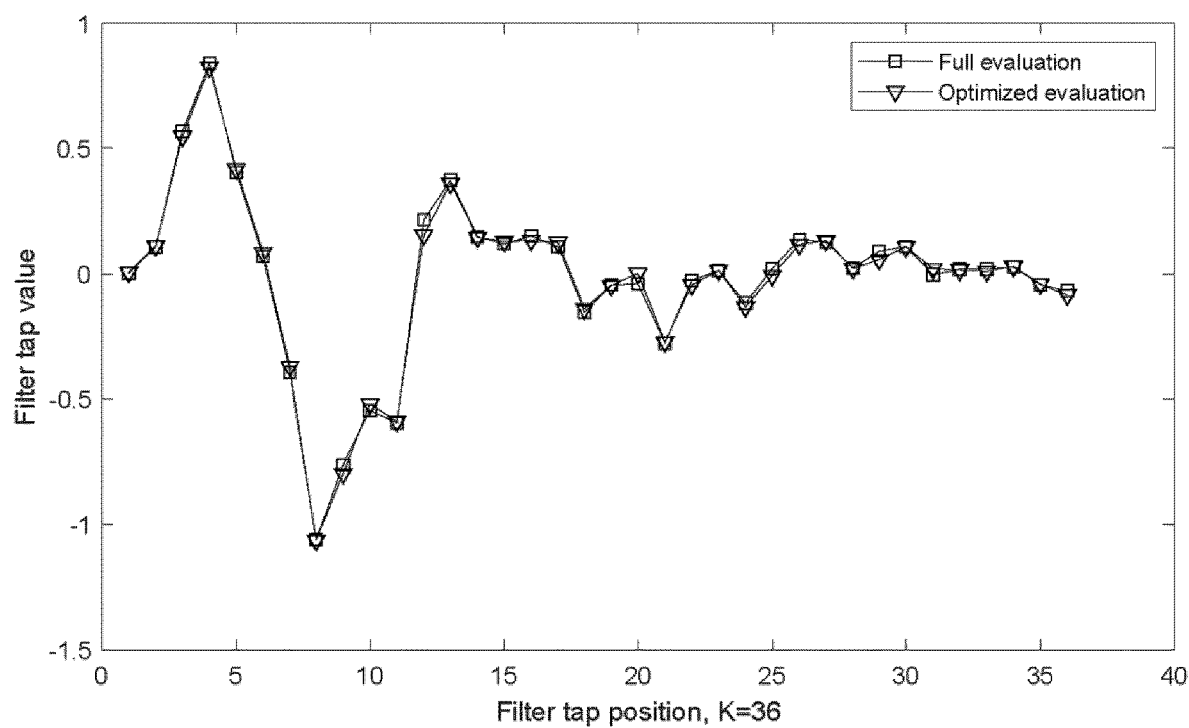
FIG. 3 compares the HR filters resulting from exact quantification of a model, by summing all basis vectors, to that of an optimized calculation.

FIG. 3 compares the HR filters resulting from exact quantification of the model, by summing all basis vectors, to that of the optimized calculation. The steps taken for this particular calculation are illustrated by the series of FIGS. 4-7. For this example calculation, S=3 and there are N=3 basis vectors and K=36 filter values. For step 7, the number of sub-vectors per-section s to be used is $q_s$=[2, 2, 1] (i.e., $q_1$=2, etc.).

In the algorithm steps outlined above, alpha and f are kept separated until step 10 where the section estimate $\hat{h}_s$ is calculated from a matrix product of $f'_s$ and $\alpha'_s$ (equation 14). This matrix product is a sum of products weighting values with basis vectors. In FIGS. 4-7, the corresponding data has been plotted but with the appropriate weighting factor applied. While this does not match the algorithm steps, it is useful, for illustration, as it reveals which of the basis components have the largest values and therefore will contribute to the final calculated HR filter.

Figure 4:
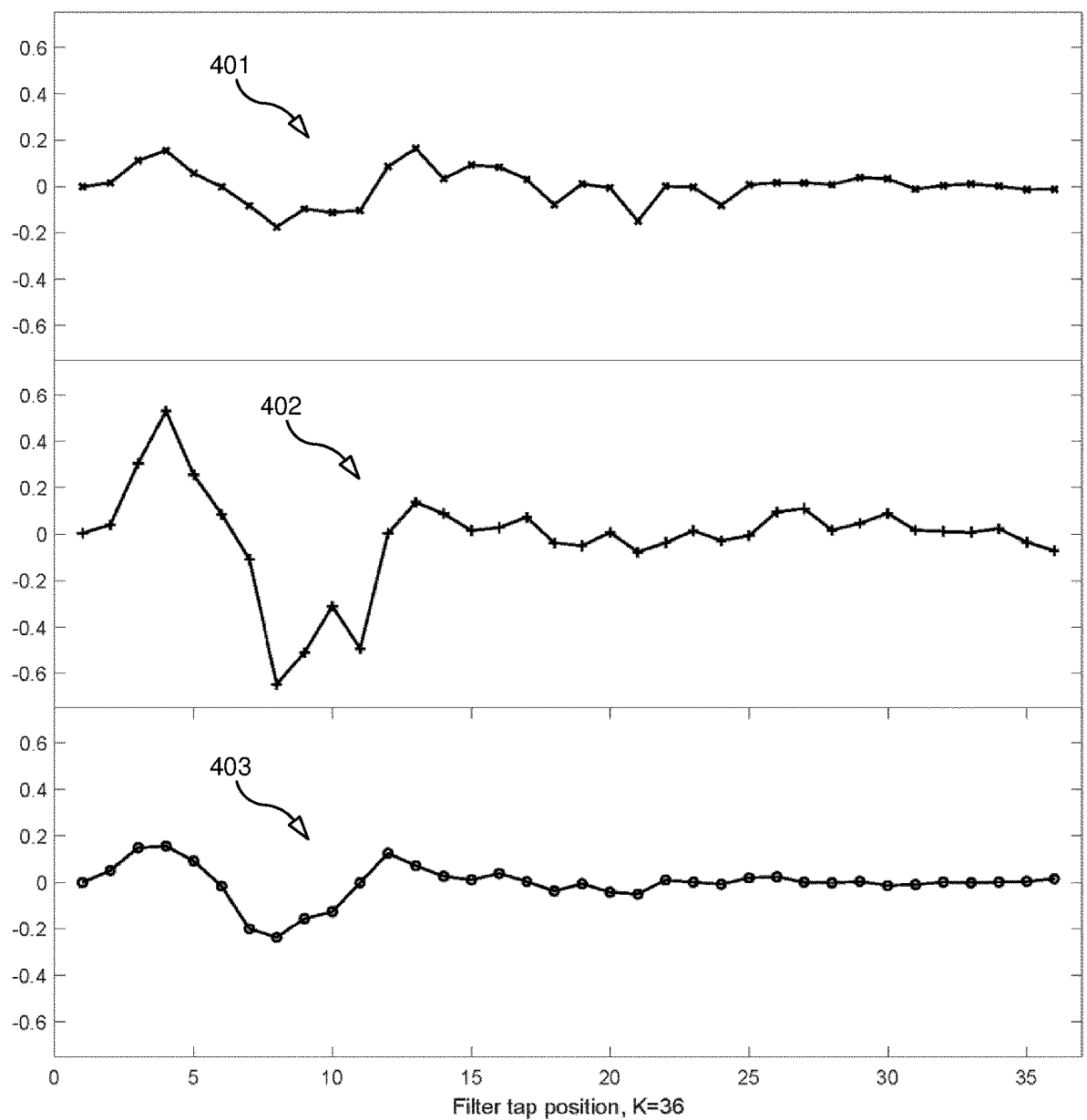
FIG. 4 shows three available basis vectors.

FIG. 4 shows the N=3 available basis vectors (i.e., basis vectors 401, 402, and 403) that are available to build the HR filter estimate from.

Figure 5:
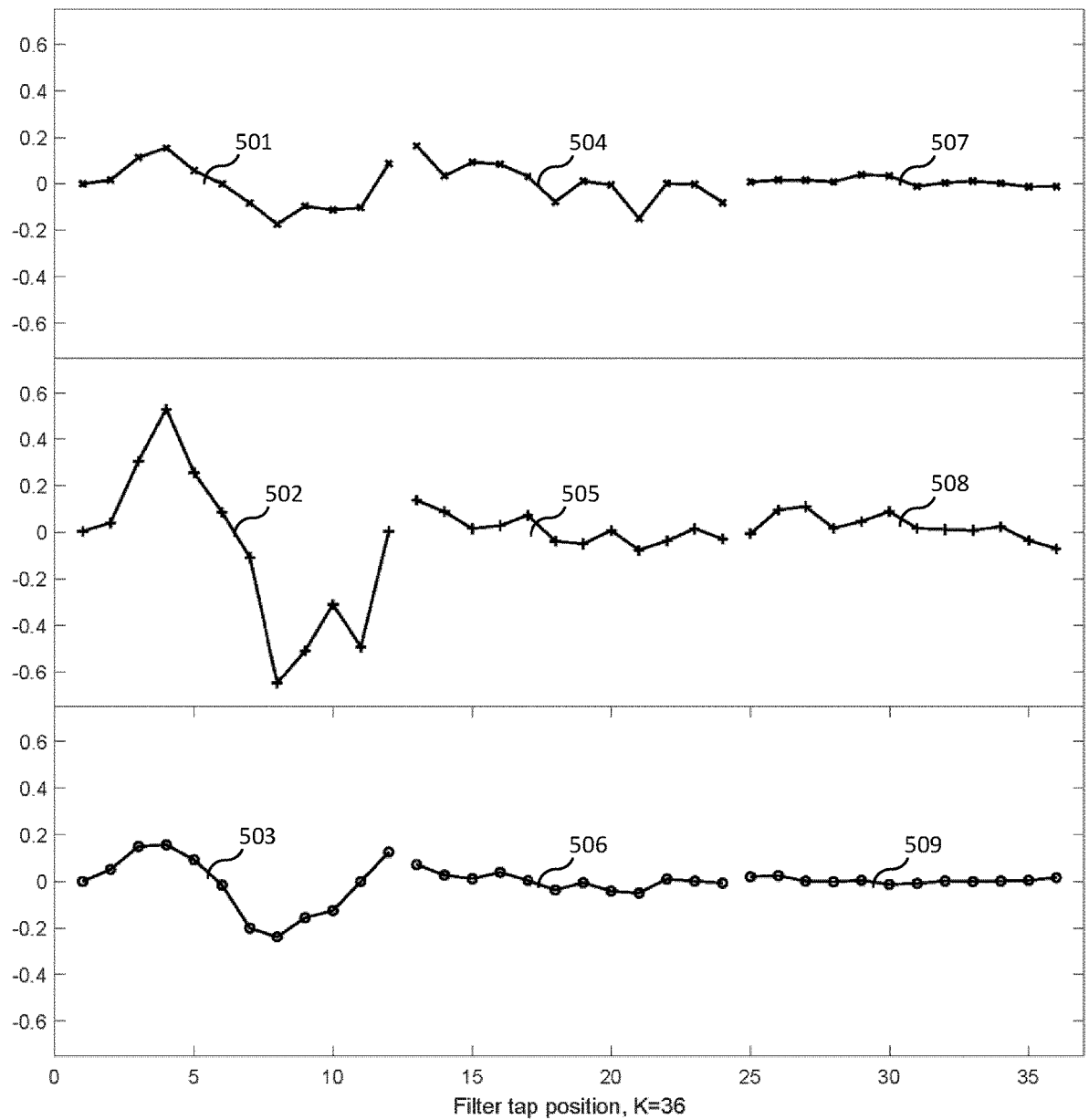
FIG. 5 shows the splitting of the basis vectors into sections.

FIG. 5 shows the splitting of each of the 3 basis vectors into S=3 sections i.e., the S sub-vectors of each one of the N basis vectors), corresponding to algorithm step 1. As shown in FIG. 5, the sub-vectors associated with the first section of the filter are sub-vectors 501, 502, and 502; the sub-vectors associated with the second section of the filter are sub-vectors 504, 505, and 506; and the sub-vectors associated with the third section of the filter are sub-vectors 507, 508, and 509.

Figure 6:
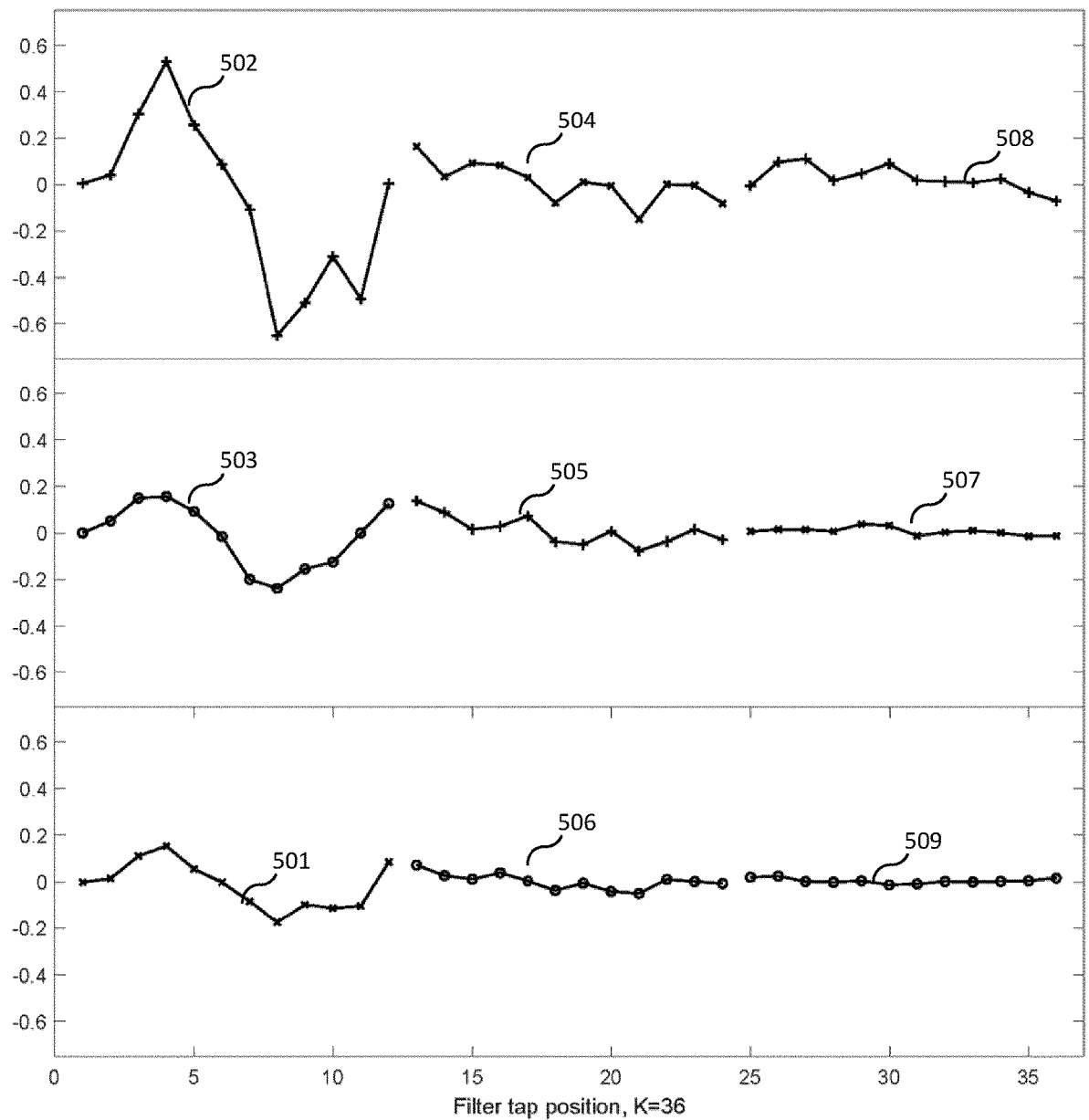
FIG. 6 shows the ordering of the basis vectors according to energy.

FIG. 6 shows the ordering of the sub-vectors within each respective section according to a metric (e.g., energy metric), corresponding to algorithm step 6.

Figure 7:
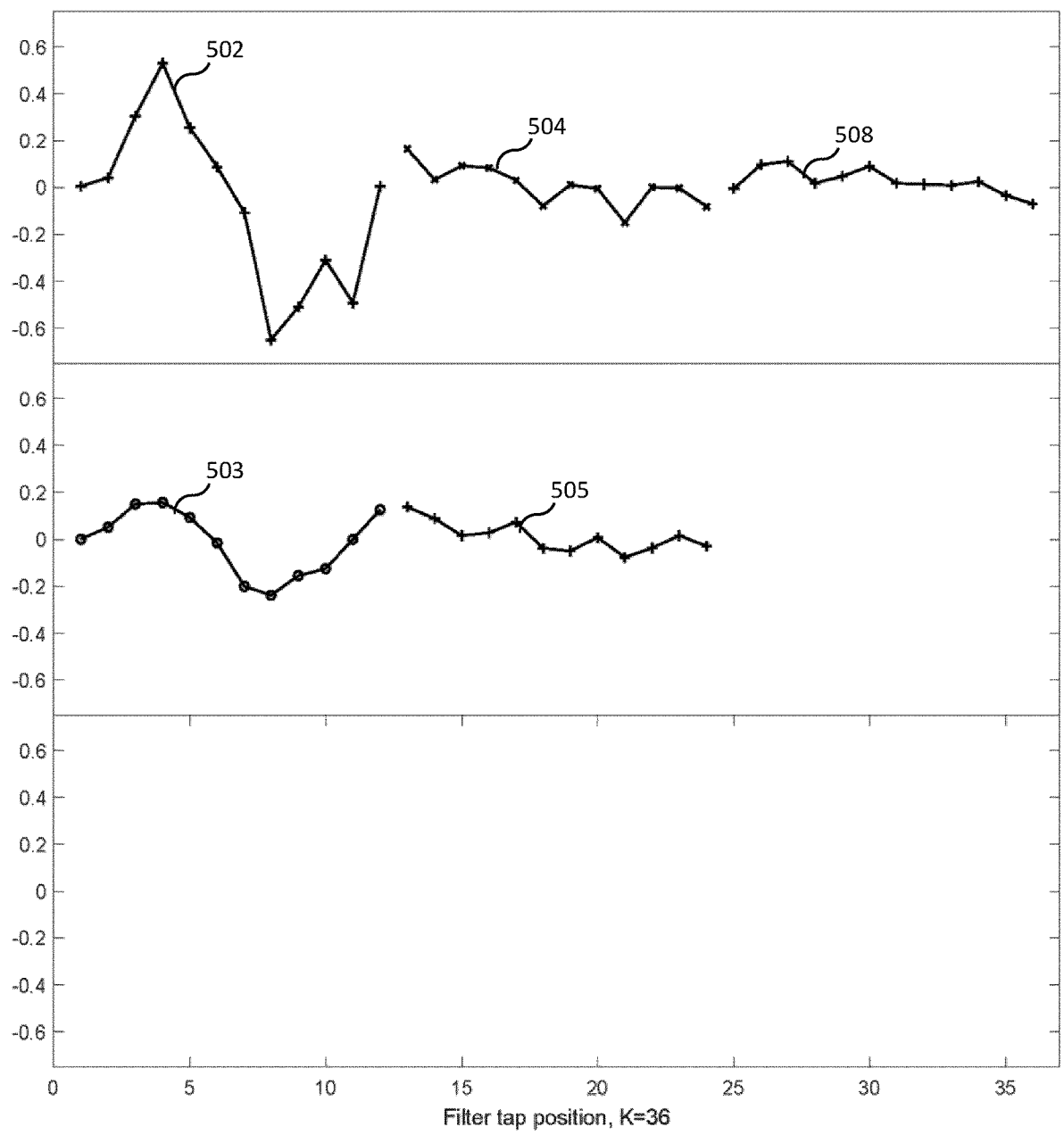
FIG. 7 shows the basis vectors that will be used in the estimate for an example filter.

FIG. 7 shows, for each section, the sub-vectors that will be used in the estimate for that section of the filter. Those sub-vectors that are not used (i.e. situated after position $q_s$ after ranking) are discarded. Note that the discarded sub-vectors in this figure correspond to information that does not need to be calculated, leading to the complexity saving of the method. As shown in FIG. 7, for the first section of the filter two sub-vectors associated with that section are used (i.e., sub-vector 502 and 503), for the second section of the filter two sub-vectors associated with that section are used (i.e., sub-vectors 504 and 505), and for the third section of the filter only a single sub-vector (i.e., sub-vector 508) associated with that section is used.

Preprocessing

Step (2) in the above process can be performed independent of the object location, and therefore can be performed as a preprocessing step rather than during the rendering process. This improves the performance of the system by reusing calculation results instead of repeating them unnecessarily. For a real-time rendering application, this preprocessing reduces the complexity of the time-critical part of the filter calculation.

Section Overlapping/Windowing

Figure 8:
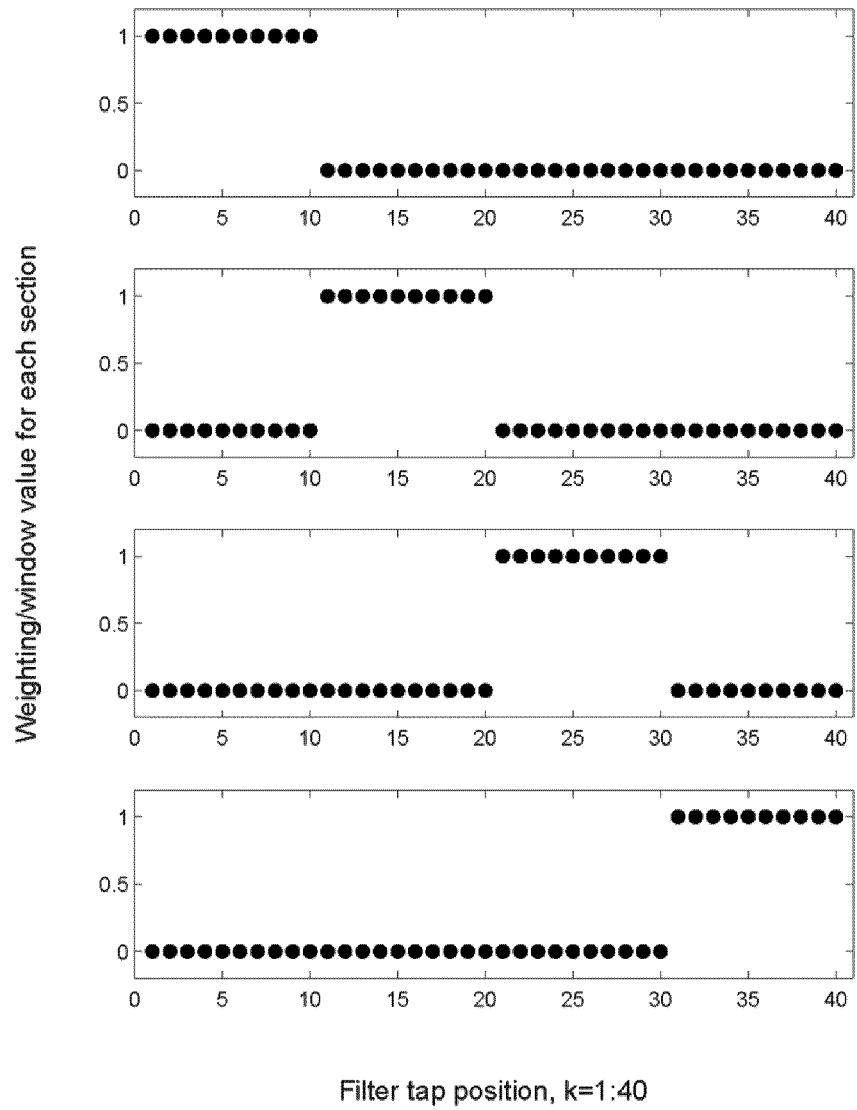
FIG. 8 illustrates an example division of K=40 elements into S=4 non-overlapping sections using discrete weighting values.
Figure 9:
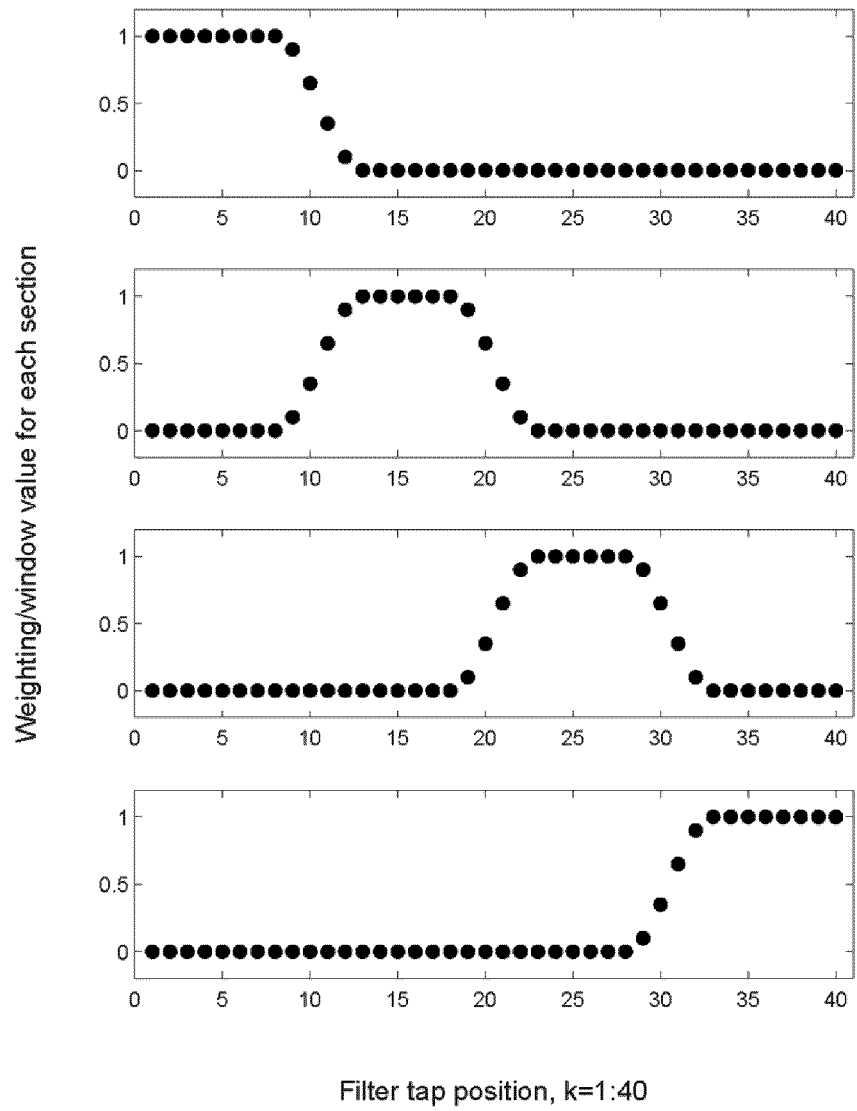
FIG. 9 illustrates an example division of K=40 elements into S=4 overlapping sections using continuous weighting values

The division of the calculation into non-overlapping sections in the above is only one possible approach. These sections are non-overlapping and have a hard transition from one section to the next. In one embodiment, windowing is used to allow a smooth transition/overlap between sections. This can prevent artefacts in the resulting filter when there is a large change in the number of components that is used in two neighboring sections. A simple example is shown in FIG. 8 (no overlapping, sections are distinct) and FIG. 9 (overlapping with a simple windowing function).

Importance Metrics

In steps 2, 4, 5, 8 and 9 above, signal energy is used as a metric for the contribution of different sub-vectors. Other embodiments use different metrics to determine the importance of the filter components, including, but not limited to: Maximum value; and Sum of absolute values. These metrics have the property that they are less complex to calculate than energy, and increase as the energy of the signal increases, so they can serve as a proxy for the energy calculation. Using such a metric gives a similar ranking behavior to using an energy calculation, but with a reduced calculation complexity.

For comparison, the energy metric and scaling factor p for this metric is repeated below, alongside those for Maximum value and Sum of absolute values.

Energy:

$$E_{ns} = \sum_j (f_n \alpha_{nsj})^2 = f_n^2 \sum_j \alpha_{nsj}^2 \quad (16)$$

$$E_s = \sum_n E_{ns}$$

$$E'_s = \sum_n E_{ns'}$$

$$n = M_1, M_2, \ldots, M_{qs}$$

$$p_s = \sqrt{\frac{E_s}{E'_s}} \geq 1$$

Maximum Value:

$$MV_{ns} = \max(\text{abs}(f_n \alpha_{nsj})) = \text{abs}(f_n)\max(\text{abs}(\alpha_{nsj})) \quad (17)$$

$$MV_s = \sum_n MV_{ns}$$

$$MV'_s = \sum_n MV_{ns'}$$

$$n = M_1, M_2, \ldots, M_{qs}$$

$$p_s = \frac{MV_s}{MV'_s} \geq 1$$

Sum of Absolute Values:

$$SA_{ns} = \sum_j \text{abs}(f_n \alpha_{nsj}) = \text{abs}(f_n)\sum_j (\text{abs}(\alpha_{nsj})) \quad (18)$$

$$SA_s = \sum_n SA_{ns}$$

$$SA'_s = \sum_n SA_{ns'}$$

$$n = M_1, M_2, \ldots, M_{qs}$$

$$p_s = \frac{SA_s}{SA'_s} \geq 1$$

Figure 10A:
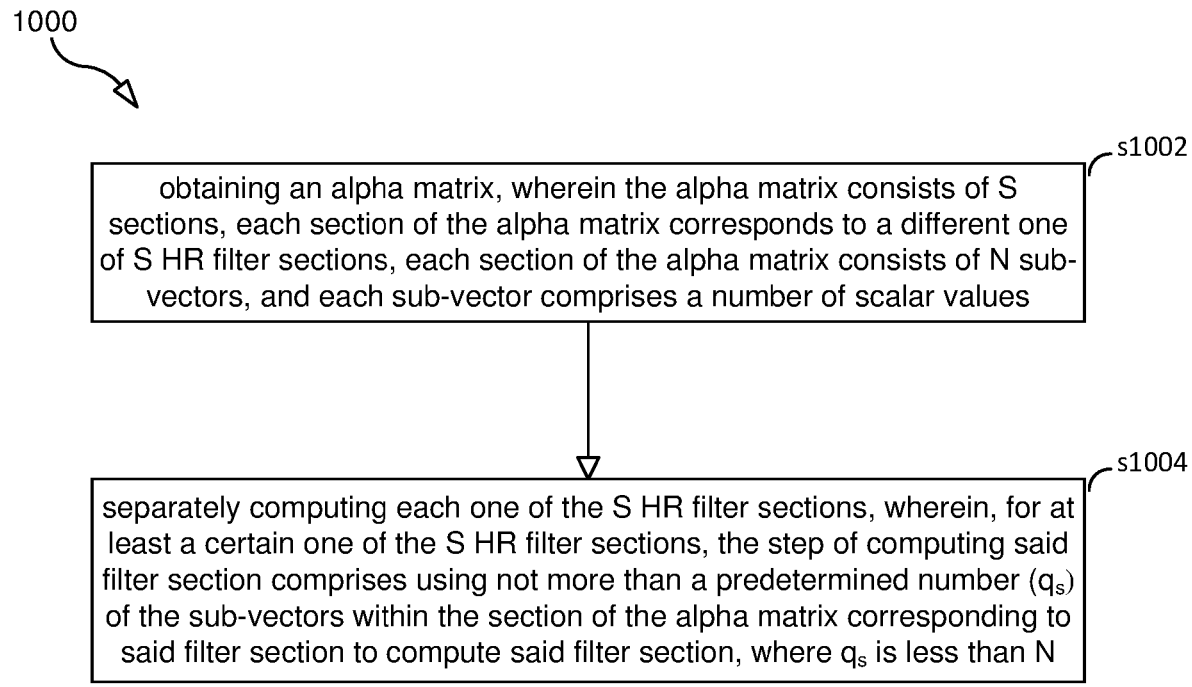
FIG. 10A is a flowchart illustrating a process according to some embodiments.

FIG. 10A is a flowchart illustrating a process 1000, according to some embodiments, for producing an estimated head-related (HR) filter, $\hat{h}'$ that consists of a set of S HR filter sections $\hat{h}'_s$ for s=1 to S. Process 1000 may begin with step s1002. Step s1002 comprises obtaining an alpha matrix (e.g., an N×K matrix), wherein the alpha matrix consists of S sections, where each one of the sections of the alpha matrix corresponds to a different one of the S HR filter sections (e.g., the first section of the alpha matrix corresponds to $\hat{h}'_1$, the second section of the alpha matrix corresponds to $\hat{h}'_2$, etc.), each section of the alpha matrix consists of N sub-vectors (N>1, e.g., N=8), and each sub-vector comprises a number of scalar values. Step s1004 comprises separately computing each one of the S HR filter sections, wherein, for at least a certain one of the S HR filter sections, $\hat{h}'_s$, the step of computing $\hat{h}'_s$ comprises using not more than a predetermined number, $q_s$, of the sub-vectors within the section of the alpha matrix corresponding to $\hat{h}'_s$ to compute $\hat{h}'_s$ where $q_s$ is less than N.

Figure 10B:
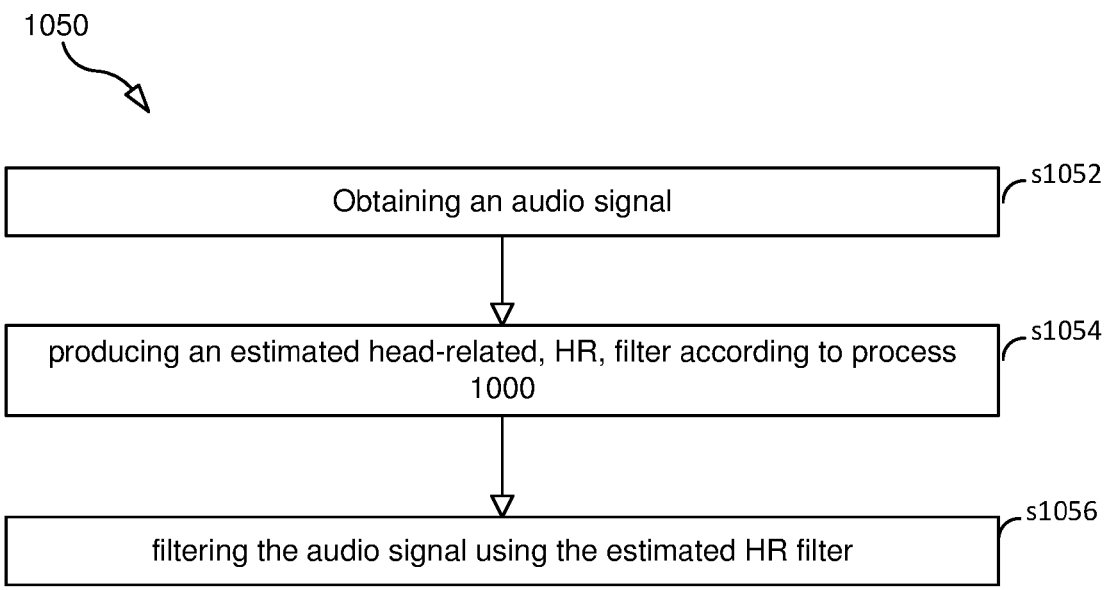
FIG. 10B is a flowchart illustrating a process according to some embodiments.

FIG. 10B is a flowchart illustrating a process 1050, according to some embodiments, for audio signal filtering. Process 1050 comprises step s1052, which comprises obtaining an audio signal. Step s1054 comprises producing an estimated head-related, HR, filter according to any one of embodiments disclosed herein. Step s1056 comprises filtering the audio signal using the estimated HR filter.

Figure 11:
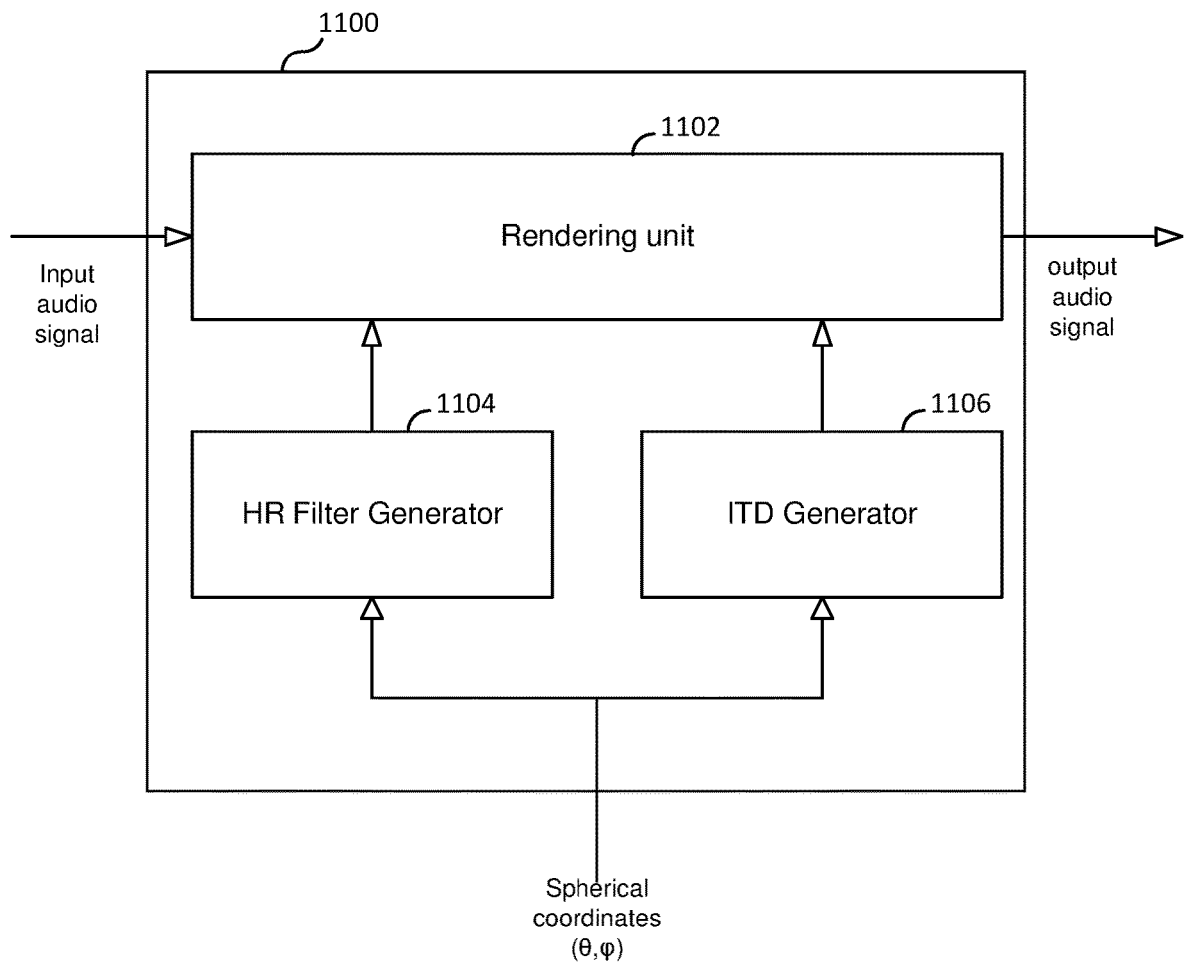
FIG. 11 illustrates an audio rendering unit according to an embodiment.

FIG. 11 illustrates an audio rendering unit 1100 according to some embodiments. Audio rendering unit 1100 includes a rendering unit 1102, an HR filter generator 1104, and an ITD generator 1106. In other embodiments, the ITD generator 1106 is optional (for instance, in some use cases the ITD value is always zero). HR filter generator 1104 functions to produce estimated HR filters, as described herein, at any elevation and azimuth angle requested by the rendering unit 1102 in real time. Likewise, ITD generator generates an ITD at any elevation and azimuth angle requested by the rendering unit 1102 in real time, which may entail an efficient evaluation of the ITD from an ITD model that has been loaded into the unit as described in reference [1].

Figure 12:
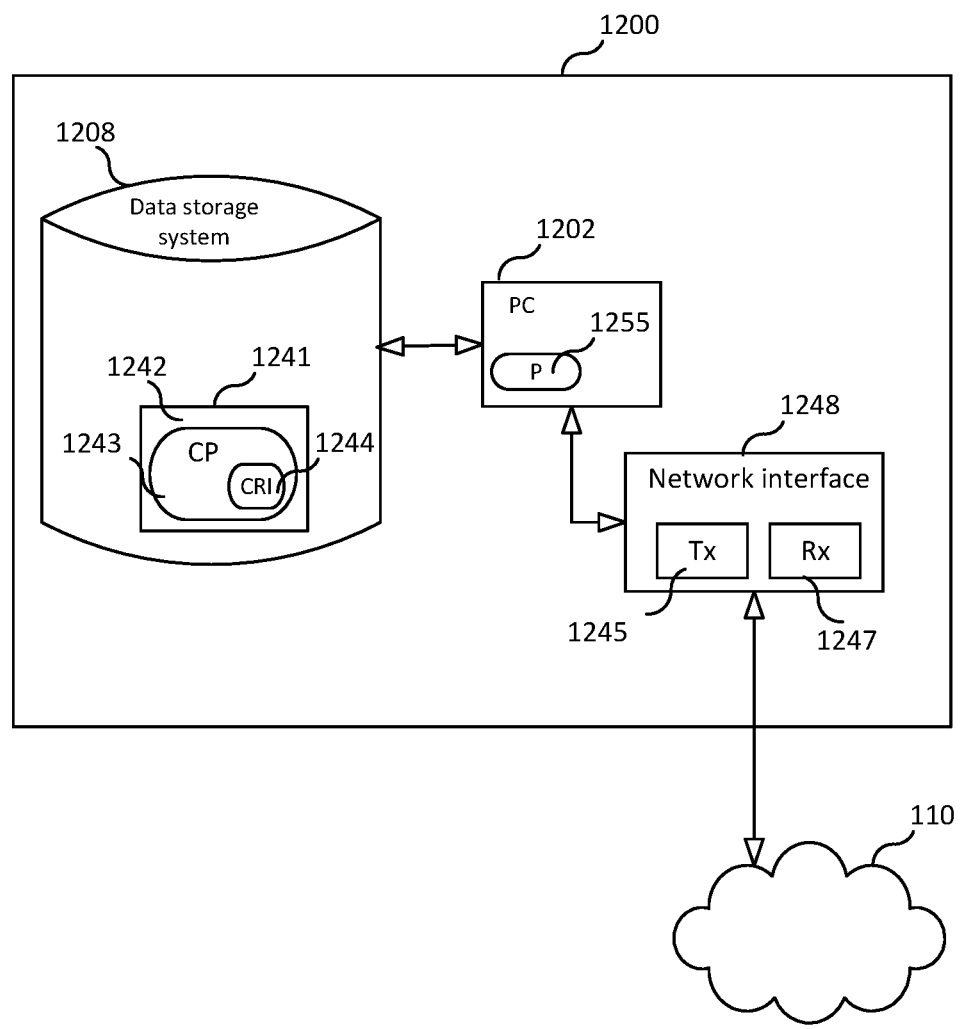
FIG. 12 illustrates a filter apparatus according to some embodiments.

FIG. 12 is a block diagram of an audio rendering apparatus 1200, according to some embodiments, for implementing audio rendering unit 1100. That is, audio rendering apparatus 1200 is operative to perform the processes disclosed herein. As shown in FIG. 12, audio rendering apparatus 1200 may comprise: processing circuitry (PC) 1202, which may include one or more processors (P) 1255 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., audio rendering apparatus 1200 may be a distributed computing apparatus); at least one network interface 1248 comprising a transmitter (Tx) 1245 and a receiver (Rx) 1247 for enabling audio rendering apparatus 1200 to transmit data to and receive data from other nodes connected to a network 110 (e.g., an Internet Protocol (IP) network) to which network interface 1248 is connected (directly or indirectly) (e.g., network interface 1248 may be wirelessly connected to the network 110, in which case network interface 1248 is connected to an antenna arrangement); and a storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes audio rendering apparatus 1200 to perform steps described herein (e.g., steps described herein with reference to the flow charts). In other embodiments, audio rendering apparatus 1200 may be configured to perform steps described herein without the need for code. That is, for example, PC 1202 may consist merely of one or more ASICs. Hence, the features of the embodiments described herein may be implemented in hardware and/or software.

The following is a summary of various embodiments described herein:

A1. A method 1000 (see FIG. 10A) for producing an estimated head-related (HR) filter, $\hat{h}'$, that consists of a set of S HR filter sections $\hat{h}'_s$ for s=1 to S, the method comprising: obtaining s1002 an alpha matrix (e.g., an N×K matrix), wherein the alpha matrix consists of S sections, where each one of the sections of the alpha matrix corresponds to a different one of the S HR filter sections (e.g., the first section of the alpha matrix corresponds to $\hat{h}'_1$, the second section of the alpha matrix corresponds to $\hat{h}'_2$, etc.), each section of the alpha matrix consists of N sub-vectors (N>1, e.g., N=8), and each sub-vector comprises a number of scalar values; and separately computing s1004 each one of the S HR filter sections, wherein, for at least a certain one of the S HR filter sections, $\hat{h}'_s$, the step of computing $\hat{h}'_s$ comprises using not more than a predetermined number, $q_s$, of the sub-vectors within the section of the alpha matrix corresponding to $\hat{h}'_s$ to compute $\hat{h}'_s$, where $q_s$ is less than N.

A2. The method of embodiment A1, wherein $q_s$ of the sub-vectors within the section of the alpha matrix corresponding to $\hat{h}'_s$ are used to compute $\hat{h}'_s$, the method further comprises, for each sub-vector within the section of the alpha matrix corresponding to $\hat{h}'_s$, determining a metric value, and selecting the $q_s$ sub-vectors that are used to compute $\hat{h}'_s$ based on the determined metric values.

A2b. The method of embodiment A2, wherein determining a metric value for a sub-vector comprises calculating a scalar value for the sub-vector using at least the sub-vector as an input to the calculation.

A3. The method of embodiment A2 or A2b, wherein determining a metric value for a sub-vector comprises determining an energy value based on the sub-vector and one or more weight values associated with the sub-vector.

A4. The method of embodiment A2 or A2b, wherein determining the metric value for a sub-vector comprises setting the metric value for the sub-vector according to equation (17).

A5. The method of embodiment A2 or A2b, wherein determining the metric value for a sub-vector comprises setting the metric value for the sub-vector according to equation (18).

A6. The method of any one of embodiments A2-A5, wherein $q_s$=2, and the step of using the 2 sub-vectors to compute $\hat{h}'_s$ comprises: computing w1×v11+w2×v12; and computing w1×v21+w2×v22, where w1 is a weight value associated with a first of the 2 sub-vectors within the section of the alpha matrix corresponding to $\hat{h}'_s$, w2 is a weight value associated with a second of the 2 sub-vectors, v11 is the first scalar value within the first sub-vector, v21 is the second scalar value within the first sub-vector, v12 is the first scalar value within the second sub-vector, and v22 is the second scalar value within the second sub-vector.

A7. The method of embodiment A6, wherein w1=f1×$p_s$, w2=f2×$p_s$, f1 is a predetermined weight value associated with the first sub-vector, f2 is a predetermined weight value associated with the second sub-vector, and $p_s$ is a scaling factor associated with the section.

B1. A method 1050 (see FIG. 10B) for audio signal filtering, the method comprising: obtaining s1052 an audio signal; producing s1054 an estimated head-related, HR, filter according to any one of embodiments A1-A7; and filtering s1056 the audio signal using the estimated HR filter.

C1. A computer program 1243 comprising instructions 1244 which when executed by processing circuitry 1202 of an audio rendering apparatus 1200 causes the audio rendering apparatus 1200 to perform the method of any one of the above embodiments.

C2. A carrier containing the computer program of embodiment C1, wherein the carrier is one of an electronic signal, an optical signal, a radio signal, and a computer readable storage medium 1242.

D1. An audio rendering apparatus 1200, the audio rendering apparatus 1200 being adapted to perform the method of any one of the above embodiments.

E1. A audio rendering apparatus 1200, the apparatus 1201 comprising: processing circuitry 1202; and a memory 1242, the memory containing instructions 1244 executable by the processing circuitry, whereby the apparatus is operative to perform the method of any one of the above embodiments.

While various embodiments are described herein it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations $\alpha$ The matrix of scalar weighting values used in HR filter model evaluation. N rows by K columns.
$\alpha_{(n,k)}$ A single scalar entry in the matrix $\alpha$ indexed by row n and column k.
$\alpha_n$ One row of the matrix $\alpha$. A vector of size 1 by K
$\alpha_{n,s}$ One sub-vector of basis vector $\alpha_n$. The number of elements in the sub-vector corresponds to the number of columns in section s.
$\alpha_{n,s,j}$ A single scalar entry in the matrix $\alpha$, indexed by row n, section s, and column number j within section s. In other words, the j-th scalar entry in sub-vector $\alpha_{n,s}$.
$\theta$ Elevation angle
$\phi$ Azimuth angle
AR Augmented Reality
D/R ratio Direct-to-Reverberant ratio
DOA Direction of Arrival
FD Frequency Domain
FIR Finite Impulse Response
HR Filter Head-Related Filter
HRIR Head-Related Impulse Response
HRTF Head-Related Transfer Function
ILD Interaural Level Difference
IR Impulse Response
ITD Interaural Time Difference
MAA Minimum Audible Angle
MR Mixed Reality
SAOC Spatial Audio Object Coding
TD Time Domain
VR Virtual Reality
XR eXtended Reality

REFERENCES

[1] Mengqui Zhang and Erlendur Karlsson, U.S. patent application No. 62/915,992, Oct. 16, 2019.

The invention claimed is:

1. A method for audio signal filtering, the method comprising:
producing an estimated head-related (HR) filter, h', that consists of a set of S HR filter sections $\hat{h}'_s$ for s=1 to S;
obtaining an audio signal; and
filtering the audio signal using the estimated HR filter, wherein
producing the estimated HR filter comprises:
obtaining an alpha matrix, wherein the alpha matrix consists of S sections, where each one of the sections of the alpha matrix corresponds to a different one of the S HR filter sections, each section of the alpha matrix consists of N sub-vectors, and each sub-vector comprises a number of scalar values; and
computing each one of the S HR filter sections, wherein, for at least a certain one of the S HR filter sections, $\hat{h}'_s$, the step of computing $\hat{h}'_s$ comprises using a predetermined number, $q_s$, of the sub-vectors within the section of the alpha matrix corresponding to $\hat{h}'_s$ to compute $\hat{h}'_s$, where $q_s$ is less than N, wherein the method further comprises, for each sub-vector within the section of the alpha matrix corresponding to $\hat{h}'_s$, determining a metric value for the sub-vector, and selecting the $q_s$ sub-vectors that are used to compute $\hat{h}'_s$ based on the determined metric values.

2. A non-transitory computer readable storage medium storing a computer program comprising instructions which when executed by processing circuitry of an audio rendering apparatus causes the audio rendering apparatus to perform the method of claim 1.

3. An audio rendering apparatus, the audio rendering apparatus comprising:
processing circuitry; and
memory, the memory containing instructions executable by the processing circuitry for configuring the audio rendering apparatus to perform a method comprising:
producing an estimated head-related (HR) filter, $\hat{h}'$, that consists of a set of S HR filter sections $\hat{h}'_s$ for s=1 to S; and
filtering an audio signal using the estimated HR filter, wherein
producing the estimated HR filter comprises:
obtaining an alpha matrix, wherein the alpha matrix consists of S sections, where each one of the sections of the alpha matrix corresponds to a different one of the S HR filter sections, each section of the alpha matrix consists of N sub-vectors, and each sub-vector comprises a number of scalar values; and
computing each one of the S HR filter sections, wherein, for at least a certain one of the S HR filter sections, $\hat{h}'_s$, the step of computing $\hat{h}'_s$ comprises using a predetermined number, $q_s$, of the sub-vectors within the section of the alpha matrix corresponding to $\hat{h}'_s$ to compute $\hat{h}'_s$, where $q_s$ is less than N, wherein the method further comprises, for each sub-vector within the section of the alpha matrix corresponding to $\hat{h}'_s$, determining a metric value for the sub-vector, and selecting the $q_s$ sub-vectors that are used to compute $\hat{h}'_s$ based on the determined metric values.

4. The audio rendering apparatus of claim 3, wherein determining a metric value for a sub-vector comprises calculating a scalar value for the sub-vector using at least the sub-vector as an input to the calculation.

5. The audio rendering apparatus of claim 3, wherein determining a metric value for a sub-vector comprises determining an energy value based on the sub-vector and one or more weight values associated with the sub-vector.

6. The audio rendering apparatus of claim 3, wherein $q_s=2$, and
the step of using the 2 sub-vectors to compute $\hat{h}'_s$ comprises:
computing w1×v11+w2×v12; and
computing w1×v21+w2×v22, where
w1 is a weight value associated with a first of the 2 sub-vectors within the section of the alpha matrix corresponding to $\hat{h}'_s$,
w2 is a weight value associated with a second of the 2 sub-vectors,
v11 is the first scalar value within the first sub-vector,
v21 is the second scalar value within the first sub-vector,
v12 is the first scalar value within the second sub-vector, and
v22 is the second scalar value within the second sub-vector.

7. The audio rendering apparatus of claim 6, wherein $$w1 = f1 \times p_s,$$

$$w2 = f2 \times p_s,$$

f1 is a predetermined weight value associated with the first sub-vector, f2 is a predetermined weight value associated with the second sub-vector, and $p_s$ is a scaling factor associated with the section.

8. The method of claim 1, wherein determining a metric value for a sub-vector comprises calculating a scalar value for the sub-vector using at least the sub-vector as an input to the calculation.

9. The method of claim 1, wherein determining a metric value for a sub-vector comprises determining an energy value based on the sub-vector and one or more weight values associated with the sub-vector.

10. The method of claim 1, wherein determining the metric value for a sub-vector comprises setting the metric value for the sub-vector according to equation (17).

11. The method of claim 1, wherein determining the metric value for a sub-vector comprises setting the metric value for the sub-vector according to equation (18).

12. The method of claim 1, wherein $q_s = 2$, and the step of using the 2 sub-vectors to compute $\hat{h}'_s$ comprises:

computing $w1 \times v11 + w2 \times v12$; and computing $w1 \times v21 + w2 \times v22$, where w1 is a weight value associated with a first of the 2 sub-vectors within the section of the alpha matrix corresponding to $\hat{h}'_s$, w2 is a weight value associated with a second of the 2 sub-vectors, v11 is the first scalar value within the first sub-vector, v21 is the second scalar value within the first sub-vector, v12 is the first scalar value within the second sub-vector, and v22 is the second scalar value within the second sub-vector.

13. The method of claim 12, wherein $$w1 = f1 \times p_s,$$

$$w2 = f2 \times p_s,$$

f1 is a predetermined weight value associated with the first sub-vector, f2 is a predetermined weight value associated with the second sub-vector, and $p_s$ is a scaling factor associated with the section.

* * * * *

UNITED STATES PATENT AND TRADEMARK OFFICE
CERTIFICATE OF CORRECTION

| | | |
|---|---|---|
| PATENT NO. | : 12,348,952 B2 | |
| APPLICATION NO. | : 18/010749 | |
| DATED | : July 1, 2025 | |
| INVENTOR(S) | : Jansson Toftgård et al. | |

It is certified that error appears in the above-identified patent and that said Letters Patent is hereby corrected as shown below:

In the Specification

In Column 4, Line 18, in Equation (2), delete "$F_{k,n}(\theta, \phi)=F_n(\theta, \phi), \forall k$" and insert -- $F_{k,n}(\theta, \phi)=F_n(\theta, \phi), \forall k.$ --, therefor.

In Column 4, Line 47, delete "an, where" and insert -- $\alpha_n$, where --, therefor.

In Column 4, Line 49, delete "an is" and insert -- $\alpha_n$ is --, therefor.

In Column 5, Line 15, after Equation, insert Equation No. -- (6a) --, therefor.

In Column 8, Line 13, delete "K columns ($\alpha$ is also referred to herein as "alpha")." and insert the same at Line 12, after "by" as a continuation sub-point.

In Column 8, Line 24, delete "vector an" and insert -- vector $\alpha_n$ --, therefor.

In Column 8, Line 45, delete "vector an" and insert -- vector $\alpha_n$ --, therefor.

In Column 8, Line 46, delete "for a" and insert -- for $\alpha$ --, therefor.

In Column 8, Line 66, delete "a is" and insert -- $\alpha$ is --, therefor.

In Column 9, Line 14, delete "($\theta, \phi$)" and insert -- ($\theta, \phi$). --, therefor.

In Column 10, Line 50, delete "sections i.e.," and insert -- sections (i.e., --, therefor.

Signed and Sealed this
Sixth Day of January, 2026

John A. Squires
*Director of the United States Patent and Trademark Office*

CERTIFICATE OF CORRECTION (continued)
U.S. Pat. No. 12,348,952 B2

In Column 12, Lines 9-11, delete "$SA_{ns} = \sum_j \text{abs}(f_n \alpha_{nsj}) = \text{abs}(f_n) \sum_j (\text{abs}(\alpha_{nsj}))$"

and insert -- $SA_{ns} = \sum_j \text{abs}(f_n \alpha_{nsj}) = \text{abs}(f_n) \sum_j \text{abs}(\alpha_{nsj})$ --, therefor.

In Column 12, Line 24, delete "filter, ĥ′ that" and insert -- filter, ĥ′, that --, therefor.

In Column 12, Line 43, delete "compute ĥ′$_s$ where" and insert -- compute ĥ′$_s$, where --, therefor.

In Column 14, Line 57, delete "apparatus 1201" and insert -- apparatus 1200 --, therefor.

In the Claims

In Column 15, Line 52, in Claim 1, delete "(HR) filter, h′," and insert -- (HR) filter, ĥ′, --, therefor.

In Column 16, Line 4, in Claim 1, delete "h′$_s$," and insert -- ĥ′$_s$, --, therefor.